Patented Dec. 5, 1933

1,937,728

UNITED STATES PATENT OFFICE 1,937,728

CATALYST

Henry Herman Storch, Highland Park, N. J., assignor, by mesne assignments, to E. I. du Pont de Nemours and Company, a corporation of Delaware No Drawing. Original application May 16, 1927, Serial No. 191,924, now Patent No. 1,681,750. Divided and this application August 14, 1928. Serial No. 299,633

15 Claims. (Cl. 23—237)

This invention relates to the synthesis of methonal from hydrogen and carbon monoxide and specifically has for its object the preparation and use of a copper catalyst for the reaction
$2H_2 + CO = CH_3OH$.

This application is a division of my prior application S. N. 191,924, filed May 16, 1927, issued Aug. 21, 1928 as U. S. P. 1,681,750.

Copper has been mentioned as a catalyst for this reaction, but no details have ever been given. I have found that copper unless especially prepared is not a catalyst. That is, metallic sheet copper, copper gauze, or copper obtained from salts by precipitation and reduction, and the like, as ordinarily used in catalytic reactions are entirely unsuited and either do not give methyl alcohol from hydrogen and carbon monoxide or give only indifferent results.

I have found that copper obtained from copper hydroxide which has been made by precipitation from certain classes of copper salts is much more advantageous for the synthesis of methanol than reduced copper as heretofore known. My method of preparation is in general characterized by the preparation of a reduced copper starting from copper in a complex copper compound. By a complex copper compound I mean one such as is formed for example, by treatment of a copper salt solution with sufficient ammonium hydroxide to redissolve the precipitate formed by the first ammonia added.

All salts of copper, except the sulphides, are soluble in ammonium hydroxide. All cuprous salts are insoluble in water. Ammonium hydroxide added short of saturation to an aqueous solution of a cupric salt precipitates a pale blue basic salt; added just to saturation, the deep blue hydroxide $Cu(OH)_2$; added to supersaturation the precipitate $Cu(OH)_2$ redissolves to an intensely deep blue solution. The blue solution is that of a cuprammonium compound or complex copper ammonium salt. If cupric sulphate is the starting material, the cuprammonium compound is probably $CuSO_4.(NH_3)_4$ which in the deep blue solution probably is in a hydrated form i. e.

$Cu(OH)_2.2NH_4OH(NH_4)_2SO_4$ or $(NH_4)_4Cu(OH)_4SO_4$.

Other salts than the sulphate form the corresponding compounds e. g.

$Cu(NO_3)_2 + 4NH_4OH =$ $Cu(OH)_2.2NH_4OH.2NH_4NO_3$.

I prepare a copper-oxygen compound from this complex salt by addition of sodium hydroxide to the solution and boiling the solution to expel the ammonia. The copper oxide finally formed by my method gives, on reduction, a catalyst far better than that secured by precipitation without the use of the ammonia complex intermediate. The reduction can be carried out by passing hydrogen, or mixtures of hydrogen with carbon monoxide or methanol or both over the heated mass. I prefer to reduce with hydrogen saturated at room temperature with methanol. In order to prevent large uncontrollable increases in temperature during reduction it is usually desirable to dilute the reducing gas with nitrogen or other inert gas. For example a satisfactory mixture would be 3 volumes hydrogen, 2 volumes methanol vapor and 95 volumes nitrogen. This reducing mixture is passed at atmospheric pressure over the dried precipitate preferably contained in a copper lined vessel and heated to not over 300° C., and preferably to about 150-200° C.

The copper oxide may be obtained from the precipitate as a powder without a support, in which case the final reduced catalyst will be in a more or less powdered state, or the copper oxide may be precipitated in the presence of asbestos, pumice, calcined magnesia, or gels such as freshly precipitated magnesia, and the like; in these cases the final catalyst form will be my active reduced copper dispersed on the support. Freshly precipitated, undried magnesia, silica or alumina are especially effective for the formation of supports.

My copper catalyst is also useful for general hydrogenation and dehydrogenation reactions in which other forms of copper have been used.

As an indication of the value of my new catalyst over reduced copper as prepared in ordinary methods I have made a test of an ordinary reduced copper catalyst. This catalyst was prepared by precipitation of copper oxide from copper nitrate solution with sodium hydroxide and then reducing the copper oxide with hydrogen saturated with methyl alcohol. 425 parts of pure copper oxide were dissolved in dilute nitric acid; 100 parts of acid washed asbestos was stirred into this solution. A 50% solution of sodium hydroxide was now stirred in until the solution was strongly alkaline; the mixture was then boiled 15-20 minutes. The solids were separated by filtration, washed with distilled water until free from alkali metal salts, and then dried over night at 150-160° C. This dried material was reduced at 200° C. by treatment at atmospheric pressure with hydrogen saturated at room temperature with methanol, and the mixture diluted with nitrogen, thus producing reduced copper on asbestos.

This catalyst was tested for its activity in the methanol syntheses, utilizing a gas mixture having a composition of about $4H_2+CO$ at 250° C., 3000 lbs/in² pressure and a space velocity per hour (S. V. H.) of about 2500. A space time yield (S. T. Y.) equivalent to about 9 lbs. of methanol per 24 hours per cubic foot of occupied catalyst space was obtained. At 310° C. with all other conditions the same, an S. T. Y. of 75 was obtained; at 350° C. an S. T. Y. of 190 was obtained which in 7 hours dropped off to 132.

The following is an example of my preferred method of preparation and operation:

800 parts of cupric nitrate $[Cu(NO_3)_2.3H_2O]$ were dissolved in 1500 parts of water; sufficient ammonia was added to redissolve the precipitate formed by the first ammonia added and to render the solution slightly alkaline. An excess (about 500 parts) of sodium hydroxide (as a 50% aqueous solution) was added, and about 40 parts acid washed medium fibred asbestos stirred in. This mixture was boiled until no odor of ammonia was noticeable after which it was filtered and the precipitate washed with distilled water and finally dried at 120 to 130° C. for 12 hours. This material was reduced by heating to 150–200° C. and passing a nitrogen-hydrogen-methanol mixture through it.

This catalyst was tested with a gas mixture of $4H_2+CO$ at a pressure of 3000 lbs., and S. V. H. of about 3000 (calculated at 0° and 1 atmosphere), and at a temperature of 315–320° C. An average S. T. Y. of 548 was obtained during a period of 30 hours; the following 12 hours gave an average S. T. Y. of 448. The methanol was recovered from the off-gases in these runs by cooling under pressure.

I have obtained similar high yields with silica and alumina supports.

I have found it advantageous, when no support is used, to compress the powdered catalyst into the form of pills; this powdered form may be prepared by omitting the asbestos in the example given above. This pill formation is preferably carried out with the unreduced precipitate after which the pills are subjected to the reducing action as stated above. These pills may be of any convenient size and may be formed by ordinary pill making machines. I have found, for example, that pills about one-fourth inch in diameter and one-eighth inch thick give somewhat better yields than the unsupported powder or granular forms.

I have also prepared a catalyst from the cuprammonium salt solution by evaporating the solution to dryness in the presence of active charcoal. The residue and carrier were then heated for two hours at 200° C. and then the copper was formed on charcoal by reduction as previously described. Under essentially the conditions of operation given above substantial yields of methanol were obtained.

In employing this catalyst it is desirable to use gases free from the common catalyst poisons which may be present in the raw materials, such as, for example, arsenic, sulphur, phosphorous, volatile iron compounds or other deleterious constituents gathered during the gas production.

I do not in any way wish to be restricted to the exact quantities, proportions, etc., given in the preferred examples of catalyst manufacture since these may be varied, and yet my catalyst would be obtained. Nor do I wish to be limited in their utilization to the preferred examples of methanol manufacture which I have given by way of illustration. I have used these catalysts under many varying conditions and find that wide limits of pressure and temperature are permissible. All the factors such as temperature, S. V. H., pressure, etc., may be varied within wide limits in order to secure various S. T. Y.'s or percent conversions which may be desired because of mechanical or manufacturing economies.

This catalyst has also given good results with gas mixtures where the proportion of hydrogen to carbon monoxide was less as well as greater than that given in my preferred example. My catalyst will form methanol from a gas mixture having any ratio of hydrogen to carbon monoxide, but if the ratio is below one to one by volume the S. T. Y. will be considerably lower than that obtained with hydrogen in excess by volume. In general I prefer not to use less hydrogen than that required theoretically by the equation:

$$2H_2+CO=CH_3OH$$

I have found that a gas containing about four volumes of hydrogen to each volume of carbon monoxide gives the best results, and that with about 6 volumes of hydrogen the S. T. Y. is somewhat lower. For economic reasons I therefor prefer not to exceed 6 volumes of hydrogen for each volume of carbon monoxide, but I do not wish to be limited to this amount since methanol will be formed with the higher hydrogen ratios.

This catalyst is also suited for the above syntheses at temperatures ranging between 150° C. and 450° C. although I have found the best results are secured between 250° C. and 370° C. Within the temperature limits given above, methanol will be formed in substantial amounts by this catalyst at pressures of 100 lbs/in² and upwards, dependent on the temperature used. Substantial yields of methanol may even be obtained at pressures lower than this; for example, at one atmosphere. Under such conditions, however, the S. T. Y. is in general so much lower that the process would not be economical. I have found that good results are secured between 3000 and 4500 lbs/in², but do not wish to be limited to this range. The catalyst will form methanol under the pressure and temperature limits given above at any space velocity. Because of economic reasons, however, I prefer space velocities of 2000 to 20,000. The space velocities referred to here and those given in the examples of operation above are calculated with the gas volumes reduced to conditions of normal temperature and pressure i. e. 1 atmosphere and 0° C.

I claim:

1. A catalyst comprising copper obtained from a cuprammonium salt by forming a copper-oxygen compound therefrom and reducing said compound at a temperature below the melting point of copper.

2. A catalyst comprising copper on a carrier prepared by the reduction on said carrier of copper oxide which has been precipitated thereon from a cuprammonium salt solution, said reduction being carried out at a temperature below the melting point of copper.

3. Method of preparing a copper catalyst material consisting in converting a compound of copper wherein its state of valence is that of copper in a cuprammonium salt to a copper-oxygen compound and reducing said compound.

4. Process for the preparation of a copper catalyst, which comprises forming an aqueous solution of a cuprammonium salt containing an excess of ammonia adding thereto an excess of sodium hydroxide, separating the precipitate formed, washing this precipitate to remove alkali salts, drying and reducing the precipitated copper oxide at a temperature below about 300° C.

5. Process for the preparation of a copper catalyst which comprises forming an aqueous solution of a cuprammonium salt containing an excess of ammonia, adding thereto a carrier and an excess of sodium hydroxide, filtering the carrier and the precipitate formed, washing this carrier and precipitate to remove alkali salts, drying and reducing the precipitated copper oxide on said carrier at a temperature of about 150 to 200° C.

6. Process for the preparation of a copper catalyst which comprises forming an aqueous solution of a cuprammonium salt containing an excess of ammonia, adding thereto a carrier and an excess of sodium hydroxide, filtering off the carrier and the precipitate formed, washing this carrier and precipitate to remove alkali salts, drying and reducing the precipitated copper oxide on said carrier by means of hydrogen saturated with methanol.

7. Method of preparing a catalyst material which comprises forming an aqueous solution of a cuprammonium salt, adding thereto an excess of sodium hydroxide, boiling to expel ammonia and to complete precipitation, filtering, washing the precipitate to remove alkali salts, drying and reducing the precipitate at a temperature below about 300° C.

8. A catalyst comprising copper obtained by heating a cuprammonium salt to about 200° C. and then reducing the residue at a temperature below about 300° C.

9. A catalyst comprising copper obtained from cuprammonium salt by precipitating copper hydroxide from an aqueous solution of the cuprammonium salt by means of sodium hydroxide and then drying and reducing said copper hydroxide to metallic copper.

10. Process for the preparation of a copper catalyst which comprises forming an aqueous solution of cuprammonium salt containing an excess of ammonia, evaporating said solution to dryness, heating and reducing the residue at a temperature of about 150 to 200° C.

11. Method of preparing a copper catalyst material consisting in converting a compound of copper wherein its state of valence is that of copper in a cuprammonium salt to a copper-oxygen compound and reducing said compound by means of a gaseous reducing agent at a temperature below the melting point of copper.

12. Method of preparing a catalyst material which comprises forming an aqueous solution of a cuprammonium salt, adding thereto an excess of sodium hydroxide, boiling to expel ammonia and to complete precipitation, filtering, washing the precipitates to remove alkali salts, drying and reducing the precipitate by means of a gaseous reducing agent at a temperature below the melting point of copper.

13. Method of preparing a copper catalyst material consisting in converting a compound of copper wherein its state of valence is that of copper in a cuprammonium salt to a copper-oxygen compound and reducing said compound by means of a gaseous reducing agent diluted with an inert gas at a temperature below the melting point of copper.

14. Process for the preparation of a copper catalyst, which comprises forming an aqueous solution of a cuprammonium salt containing an excess of ammonia adding thereto an excess of sodium hydroxide, separating the precipitate formed, washing this precipitate to remove alkali salts, drying and reducing the precipitated copper oxide by means of a gaseous reducing agent mixed with an inert gas at a temperature below the melting point of copper.

15. Process for the preparation of a copper catalyst which comprises forming an aqueous solution of a cuprammonium salt containing an excess of ammonia, adding thereto a carrier and an excess of sodium hydroxide, filtering off the carrier and the precipitate formed, washing this carrier and precipitate to remove alkali salts, drying and reducing the precipitated copper oxide on said carrier by means of a mixture of hydrogen, methanol and nitrogen.

HENRY HERMAN STORCH.

CERTIFICATE OF CORRECTION.

Patent No. 1,937,728.                                   December 5, 1933.

HENRY HERMAN STORCH.

It is hereby certified that error appears in the printed specification of the above numbered patent requiring correction as follows: Page 3, line 49, claim 9, for "to metallic copper" read of a temperature below about 300°C; and that the said Letters Patent should be read with this correction therein that the same may conform to the record of the case in the Patent Office.

Signed and sealed this 9th day of January, A. D. 1934.

F. M. Hopkins (Seal)                                                   Acting Commissioner of Patents.

copper wherein its state of valence is that of copper in a cuprammonium salt to a copper-oxygen compound and reducing said compound.

4. Process for the preparation of a copper catalyst, which comprises forming an aqueous solution of a cuprammonium salt containing an excess of ammonia adding thereto an excess of sodium hydroxide, separating the precipitate formed, washing this precipitate to remove alkali salts, drying and reducing the precipitated copper oxide at a temperature below about 300° C.

5. Process for the preparation of a copper catalyst which comprises forming an aqueous solution of a cuprammonium salt containing an excess of ammonia, adding thereto a carrier and an excess of sodium hydroxide, filtering the carrier and the precipitate formed, washing this carrier and precipitate to remove alkali salts, drying and reducing the precipitated copper oxide on said carrier at a temperature of about 150 to 200° C.

6. Process for the preparation of a copper catalyst which comprises forming an aqueous solution of a cuprammonium salt containing an excess of ammonia, adding thereto a carrier and an excess of sodium hydroxide, filtering off the carrier and the precipitate formed, washing this carrier and precipitate to remove alkali salts, drying and reducing the precipitated copper oxide on said carrier by means of hydrogen saturated with methanol.

7. Method of preparing a catalyst material which comprises forming an aqueous solution of a cuprammonium salt, adding thereto an excess of sodium hydroxide, boiling to expel ammonia and to complete precipitation, filtering, washing the precipitate to remove alkali salts, drying and reducing the precipitate at a temperature below about 300° C.

8. A catalyst comprising copper obtained by heating a cuprammonium salt to about 200° C. and then reducing the residue at a temperature below about 300° C.

9. A catalyst comprising copper obtained from cuprammonium salt by precipitating copper hydroxide from an aqueous solution of the cuprammonium salt by means of sodium hydroxide and then drying and reducing said copper hydroxide to metallic copper.

10. Process for the preparation of a copper catalyst which comprises forming an aqueous solution of cuprammonium salt containing an excess of ammonia, evaporating said solution to dryness, heating and reducing the residue at a temperature of about 150 to 200° C.

11. Method of preparing a copper catalyst material consisting in converting a compound of copper wherein its state of valence is that of copper in a cuprammonium salt to a copper-oxygen compound and reducing said compound by means of a gaseous reducing agent at a temperature below the melting point of copper.

12. Method of preparing a catalyst material which comprises forming an aqueous solution of a cuprammonium salt, adding thereto an excess of sodium hydroxide, boiling to expel ammonia and to complete precipitation, filtering, washing the precipitates to remove alkali salts, drying and reducing the precipitate by means of a gaseous reducing agent at a temperature below the melting point of copper.

13. Method of preparing a copper catalyst material consisting in converting a compound of copper wherein its state of valence is that of copper in a cuprammonium salt to a copper-oxygen compound and reducing said compound by means of a gaseous reducing agent diluted with an inert gas at a temperature below the melting point of copper.

14. Process for the preparation of a copper catalyst, which comprises forming an aqueous solution of a cuprammonium salt containing an excess of ammonia adding thereto an excess of sodium hydroxide, separating the precipitate formed, washing this precipitate to remove alkali salts, drying and reducing the precipitated copper oxide by means of a gaseous reducing agent mixed with an inert gas at a temperature below the melting point of copper.

15. Process for the preparation of a copper catalyst which comprises forming an aqueous solution of a cuprammonium salt containing an excess of ammonia, adding thereto a carrier and an excess of sodium hydroxide, filtering off the carrier and the precipitate formed, washing this carrier and precipitate to remove alkali salts, drying and reducing the precipitated copper oxide on said carrier by means of a mixture of hydrogen, methanol and nitrogen.

HENRY HERMAN STORCH.

CERTIFICATE OF CORRECTION.

Patent No. 1,937,728.     December 5, 1933.

HENRY HERMAN STORCH.

It is hereby certified that error appears in the printed specification of the above numbered patent requiring correction as follows: Page 3, line 49, claim 9, for "to metallic copper" read of a temperature below about 300°C; and that the said Letters Patent should be read with this correction therein that the same may conform to the record of the case in the Patent Office.

Signed and sealed this 9th day of January, A. D. 1934.

F. M. Hopkins (Seal)     Acting Commissioner of Patents.